United States Patent
Sasdrich et al.

(10) Patent No.: US 12,021,969 B2
(45) Date of Patent: Jun. 25, 2024

(54) FUNCTIONS WITH A PRE-CHARGE OPERATION AND AN EVALUATION OPERATION

(71) Applicant: Cryptography Research, Inc., San Jose, CA (US)

(72) Inventors: Pascal Sasdrich, Duisburg (DE); Begül Bilgin, Leuven (BE); Michael Hutter, Vienna (AT)

(73) Assignee: Cryptography Research, Inc., San Jose, CA (US)

(*) Notice: Subject to any disclaimer, the term of this patent is extended or adjusted under 35 U.S.C. 154(b) by 162 days.

(21) Appl. No.: 17/598,189

(22) PCT Filed: Apr. 1, 2020

(86) PCT No.: PCT/US2020/026255
§ 371 (c)(1),
(2) Date: Sep. 24, 2021

(87) PCT Pub. No.: WO2020/206028
PCT Pub. Date: Oct. 8, 2020

(65) Prior Publication Data
US 2022/0191004 A1   Jun. 16, 2022

Related U.S. Application Data

(60) Provisional application No. 62/828,284, filed on Apr. 2, 2019.

(51) Int. Cl.
*H04L 29/00* (2006.01)
*H04L 9/00* (2022.01)
*H04L 9/06* (2006.01)

(52) U.S. Cl.
CPC ............ *H04L 9/0631* (2013.01); *H04L 9/003* (2013.01); *H04L 2209/04* (2013.01); *H04L 2209/125* (2013.01)

(58) Field of Classification Search
CPC .................. H04L 9/0631; H04L 9/003; H04L 2209/04; H04L 2209/125
(Continued)

(56) References Cited

U.S. PATENT DOCUMENTS

2008/0205169 A1* 8/2008 Kuenemund ............ G11C 8/20
326/8
2010/0232602 A1* 9/2010 Nobukata ............. H04L 9/0618
380/28

(Continued)

OTHER PUBLICATIONS

Notification of Transmittal of the International Search Report and the Written Opinion of the International Searching Authority, or the Declaration dated Aug. 11, 2020 re: Int'l Appln. No. PCT/US2020/026255. 13 pages.

(Continued)

*Primary Examiner* — Jeffrey C Pwu
*Assistant Examiner* — Michael D Anderson
(74) *Attorney, Agent, or Firm* — Lowenstein Sandler LLP

(57) ABSTRACT

An input data may be received. A portion of a cryptographic operation may be performed with the received input data at a first function component. During the performance of the cryptographic operation at the first function component, a pre-charge operation may be performed at a second function component. Furthermore, the second function component may be used to perform another portion of the cryptographic operation with a result of the portion of the cryptographic operation performed at the first function component.

18 Claims, 7 Drawing Sheets

(58) Field of Classification Search
USPC .......................................................... 713/189
See application file for complete search history.

(56) References Cited

U.S. PATENT DOCUMENTS

2013/0120024 A1    5/2013   Verbauwhede et al.
2018/0097618 A1*   4/2018   Kumar .................... H04L 9/003
2018/0356464 A1   12/2018   Hutter et al.

OTHER PUBLICATIONS

EP Extended European Search Report dated Dec. 12, 2022 re: EP Appln. No. 20784701.3. 9 pages.

* cited by examiner

FUNCTIONS WITH A PRE-CHARGE OPERATION AND AN EVALUATION OPERATION

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
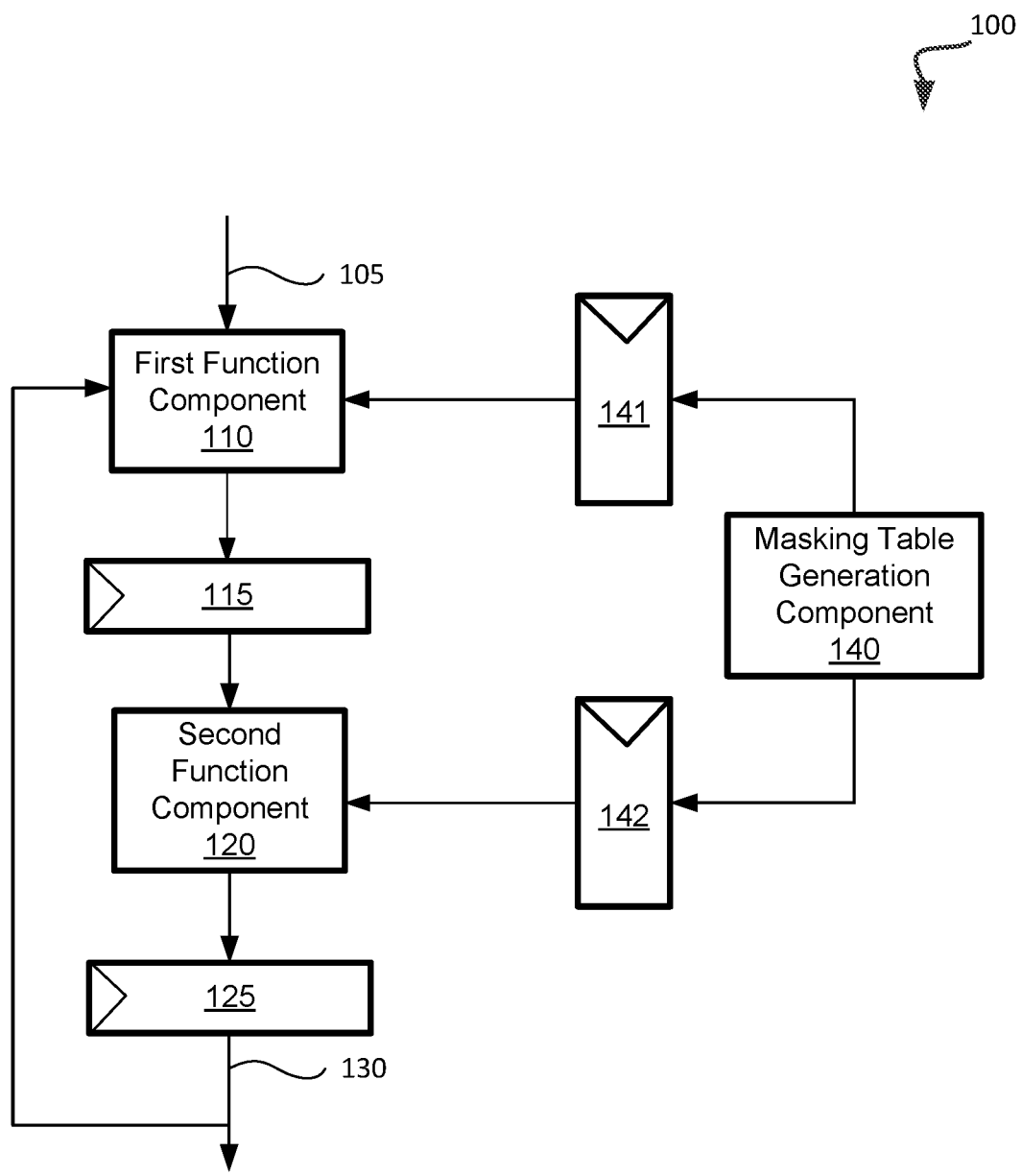
FIG. 1 illustrates an example architecture of function components that are used to perform an evaluation operation with a pre-charge operation in accordance with some embodiments of the present disclosure.

Aspects of the present disclosure are directed to functions that are used to perform an evaluation operation with a pre-charge operation. The functions can be logical components that are each used to perform different portions or rounds of a cryptographic or other such operation. The evaluation operation can refer to an operation that uses the function to generate or modify data, and the pre-charge operation can refer to an operation that involves resetting the logical components and any memory element (e.g., flip-flops or registers) of the function to a same single value (e.g., a '0').

As a cryptographic operation is performed at a device, an attacker (e.g., an unauthorized entity) may seek to compromise the security of the cryptographic operation. For example, the cryptographic operation may utilize a secret value, such as a cryptographic key, and the attacker may attempt to obtain the secret value from the device as the cryptographic operation is performed. To obtain the secret value, the attacker may perform a differential power analysis (DPA) attack (or other such side channel attack) by analyzing the power consumption of the device as the secret value is used by the cryptographic operation.

Countermeasures may be used so that the cryptographic operation is less susceptible to compromise by the attacker. For example, input data to the cryptographic operation may be masked when being utilized by the cryptographic operation. However, such masking techniques may be specific to a particular algorithm of the cryptographic operation and may require additional logical components to mask the input data. Furthermore, the masking techniques may add latency to the cryptographic operation as additional time is used to mask the input data before being used by the cryptographic operation.

Aspects of the present disclosure address the above and other deficiencies by performing an evaluation operation with a pre-charge operation at components used to perform functions of the cryptographic operation. The evaluation operation can be performed concurrently (i.e., at the same time) as the pre-charge operation. For example, the evaluation operation can be performed for a first function component while the pre-charge operation is performed for a second function component. The first function component and the second function component may be used to perform the cryptographic operation. Memory elements (e.g., registers) may be used to separate the two function components. After the evaluation operation has completed at the first function component and the output of the evaluation has been stored at a first memory element of the first function component, the pre-charge operation may then be performed at the first function component and the evaluation operation can be performed at the second function component. For example, the output of the first function component at the first memory element may be utilized by the second function component during the evaluation operation and the first function component (along with the first memory element) can be reset or pre-charged. The output of the evaluation operation at the second function component may be stored at a second memory element that had been previously pre-charged. As a result, the pre-charge operation may reduce the correlation between the power consumption of the device with the input data used by the cryptographic operation as the function component that is to perform the evaluation operation may be reset to a single value before performing the evaluation operation.

In some embodiments, the function components may be implemented based on dual rail logic. For example, a complementary input bit may be generated for each input bit of the input data to the cryptographic operation. The complementary input data and the input data may be processed or operated on by the function components so that the power consumption of the device is independent of the input data.

Advantages of the present disclosure include, but are not limited to, improved security of a device performing a cryptographic operation by reducing susceptibility of the device to a DPA attack. Furthermore, the impact of the latency of the device may be minimal as the pre-charge operation can be concurrently performed with the evaluation operation. Thus, a cycle of the cryptographic operation is not utilized to solely perform the pre-charge operation. As a result, the performance of the device may be improved as the cryptographic operation can be performed without additional latency while also reducing the susceptibility of the device to the DPA attack.

FIG. 1 illustrates an example architecture 100 of function components that are used to perform an evaluation operation with a pre-charge operation. The architecture 100 may include multiple function components and memory elements (e.g., registers or flip-flops) where a first function component performs an evaluation operation while a second function component performs a pre-charge operation.

As shown in FIG. 1, the architecture 100 may include various function components that may be used to perform an operation. For example, the function components may be used together to perform a cryptographic operation or any other type of operation. In some embodiments, the cryptographic operation may be based on a block cipher that specifies a round of sub-operations that are executed or run multiple times. An example of such a cryptographic operation includes, but is not limited to, Advanced Encryption Standard (AES) operations. Further details with respect to AES operations are described in conjunction with FIG. 3. The architecture 100 may include a first function component 110 and a second function component 120 that each performs a portion or round of the cryptographic operation. For example, the first function component 110 may perform a first round of the cryptographic operation and the second function component 120 may perform a second round of the cryptographic operation based on the results of the first round. The first function component 110 may then perform a third round of the cryptographic operation based on the results of the second round from the second function component 120. Subsequently, the second function component 120 may perform a fourth round of the cryptographic operation based on the results of the third round from the first function component 110. Such rounds may continue to be performed by the first function component 110 and the second function component 120 until the cryptographic operation has completed with the output 130.

As shown, the first function component 110 and the second function component 120 may be separated by memory elements such as registers 115 and 125. The register 115 may be used to store the output from the first function component 110 and the register 125 may be used to store the output from the second function component 120. The output stored at the second function component 120 may subsequently be used by the first function component 110 if a further performance of a round to complete the cryptographic operation is necessary.

Furthermore, a masking table generation component 140 may be used to provide additional data that is to be used during the cryptographic operation to provide resistance to a DPA attack. The masking table generation component 140 may provide, but is not limited to, LMDPL (LUT-Masked Dual-rail with Pre-charge Logic) gate level masking that provides a masked value that is to be used during the performance of the cryptographic operation. Further details with respect to the LMDPL is described in conjunction with FIG. 3. The register 141 may be used to store a mask value from the masking table generation component 140 to be used by the first function component 110 when performing an evaluation operation and the register 142 may be used to store another mask value from the masking table generation component 140 that is to be used by the second function component 120 when performing another evaluation operation.

As previously described, the first and second function components 110 and 120 may perform an evaluation operation and a pre-charge operation. The evaluation operation may correspond to the performance of a portion or a round of the cryptographic operation. The pre-charge operation may correspond to the reset of the respective function component and the respective memory components. For example, a pre-charge operation for the first function component 110 may result in the same value (e.g., a 0) to be propagated and stored at each memory element and logic gate of the first function component 110 and register 115 by using the same pre-charge value (e.g., the '0') that is stored at register 141 and register 125. Similarly, a pre-charge operation for the second function component 120 may result in the same value (e.g., a 0) to be propagated and stored at each memory element and logic gate of the second function component 120 and register 125 by using the pre-charge value at registers 142 and 115. In the same cycle, the same value (e.g., a 0) is stored in register 141. Thus, the pre-charge operation may switch any values of '1' stored at the function components or registers to a 0 (or vice versa).

In operation, an input 105 may be received. The input 105 may be a first input for the cryptographic operation. The first function component 110 may perform the evaluation operation by executing a round of the cryptographic operation with the first input. For example, the first function component 110 may perform the cipher-block round transformation with the input 105 and the mask value from the register 141 and store the result of the first round at the register 115. While the first function component 110 is performing the evaluation operation corresponding to the first round, the second function component 120 may be pre-charged by using pre-charge values stored at the registers 125 and 142. For example, an input may be provided to the second function component 120 from the registers 115 and 142 so that the values stored at the second function component 120 are uniform (e.g., all bits are at a value of 0). Thus, the second function component 120 may receive pre-charge values stored in the registers 115 and 142 so that each register and logic component in the second function component 120 may be pre-charged, and the pre-charge value may be stored at the register 125. When the first function component 110 has completed the evaluation operation corresponding to the first round of the cryptographic operation, the output of the first round may be stored at the register 115. Subsequently, when the second function component 120 has completed the pre-charge operation, the second function component 120 can perform a next evaluation operation corresponding to the next or second round of the cryptographic operation with the output stored at the register 115 and the mask value stored at the register 142. In response to the second function component 120 performing the evaluation operation with the value stored at the register 115, the pre-charge operation may then be performed with the first function component 110 and registers 125 and 141.

As such, the function components may perform different successive portions or rounds of a cryptographic or other such operation. The first function component may perform an evaluation operation with data while the second function component may perform a pre-charge operation. The second function component may then perform a subsequent evaluation operation with the output of the first function component in response to the first function component completing the evaluation operation. Subsequently, the first function component may perform the pre-charge operation.

Figure 2:
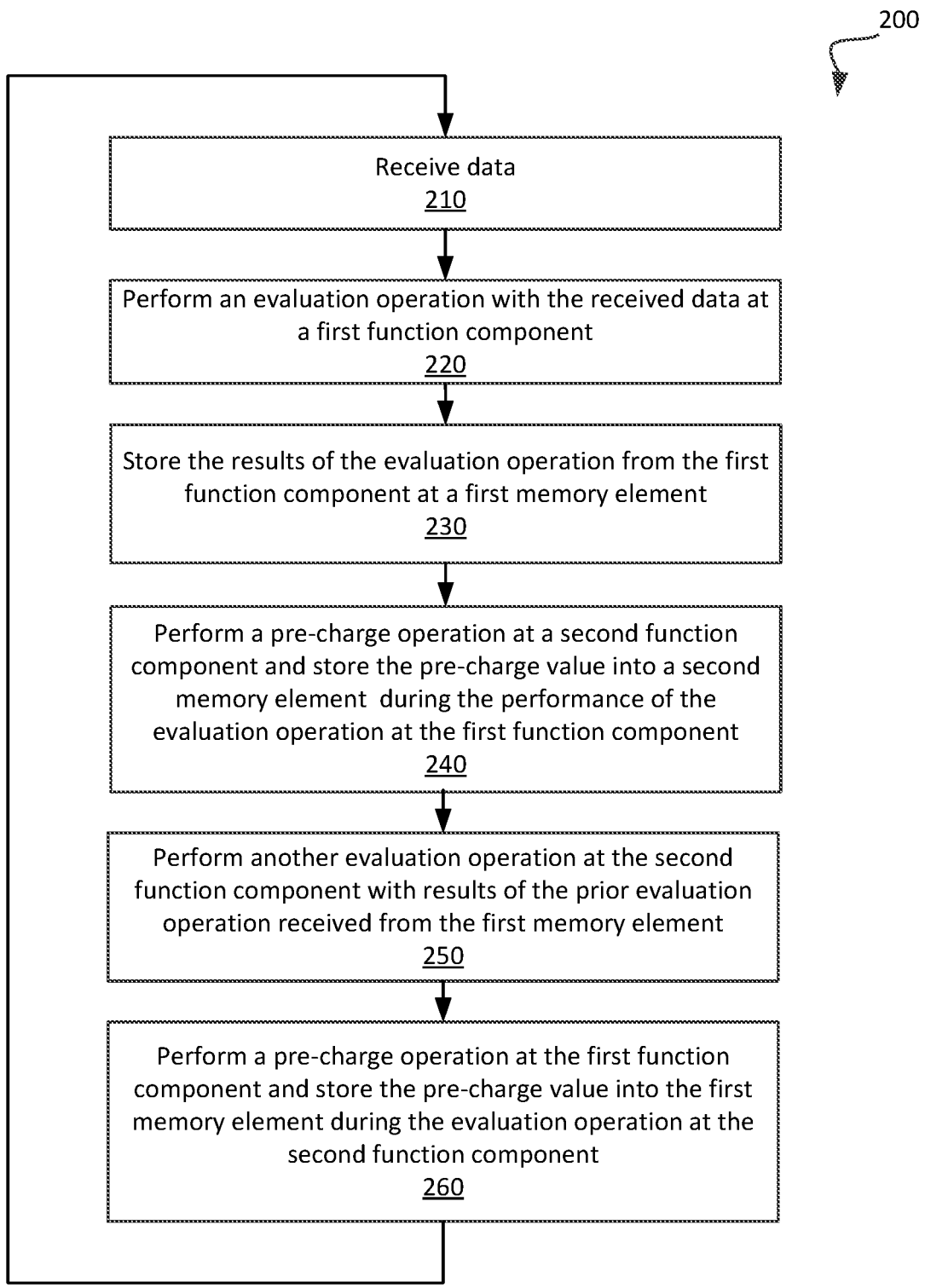
FIG. 2 is a flow diagram of an example method to perform evaluation operations with pre-charge operations in accordance with some embodiments.

FIG. 2 is a flow diagram of an example method 200 to perform evaluation operations with pre-charge operations. The method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the architecture 100 of FIG. 1.

As shown in FIG. 2, the processing logic may receive data (block 210). The data may be an input to a cryptographic operation. For example, the data may be data that is to be encrypted by an AES cryptographic operation. The processing logic may further perform an evaluation operation with the received data at a first function component (block 220). For example, a first round of the cryptographic operation may be performed. In some embodiments, the first round of the cryptographic operation may be performed with the received data and a mask value that is to be used to mask the received data when being used in the first round of the cryptographic operation. The processing logic may further store the results of the evaluation operation from the first function component at a first memory element (block 230). For example, an intermediate output value of the cryptographic operation that corresponds to an output of the evaluation operation may be stored at a first register or other such memory element. Furthermore, the processing logic may perform a pre-charge operation at a second function component and store the pre-charge value into a second memory element during the performance of the evaluation operation at the first function component (block 240). In some embodiments, the pre-charge operation may further be performed at another memory element that is to store another mask value for an evaluation operation to be performed by the second function component. In some embodiments, the logic of the respective function components may be pre-charged by using the pre-charge values at input registers to the respective function components. The logic of the respective function component may then be reset by propagating the pre-charge values through the logic of the function component.

The processing logic may perform another evaluation operation at the second function component with results of the prior evaluation operation received from the first memory element (block 250). For example, a second round of the cryptographic operation may be performed by the second function component. In some embodiments, the second round of the cryptographic operation may be performed with the results of the prior evaluation operation and another mask value that is to be used to protect the results of the prior evaluation operation when being used in the second round of the cryptographic operation. Furthermore, the processing logic may perform a pre-charge operation at the first function component and store the pre-charge value into the first memory element during the evaluation operation at the second function component (block 260). For example, the pre-charge operation may be performed for the first function component after the first function component has performed the prior evaluation operation and has stored the output of the evaluation operation at the first memory element. Subsequently, the operations of the processing logic may be repeated for each additional data that is received.

Figure 3:
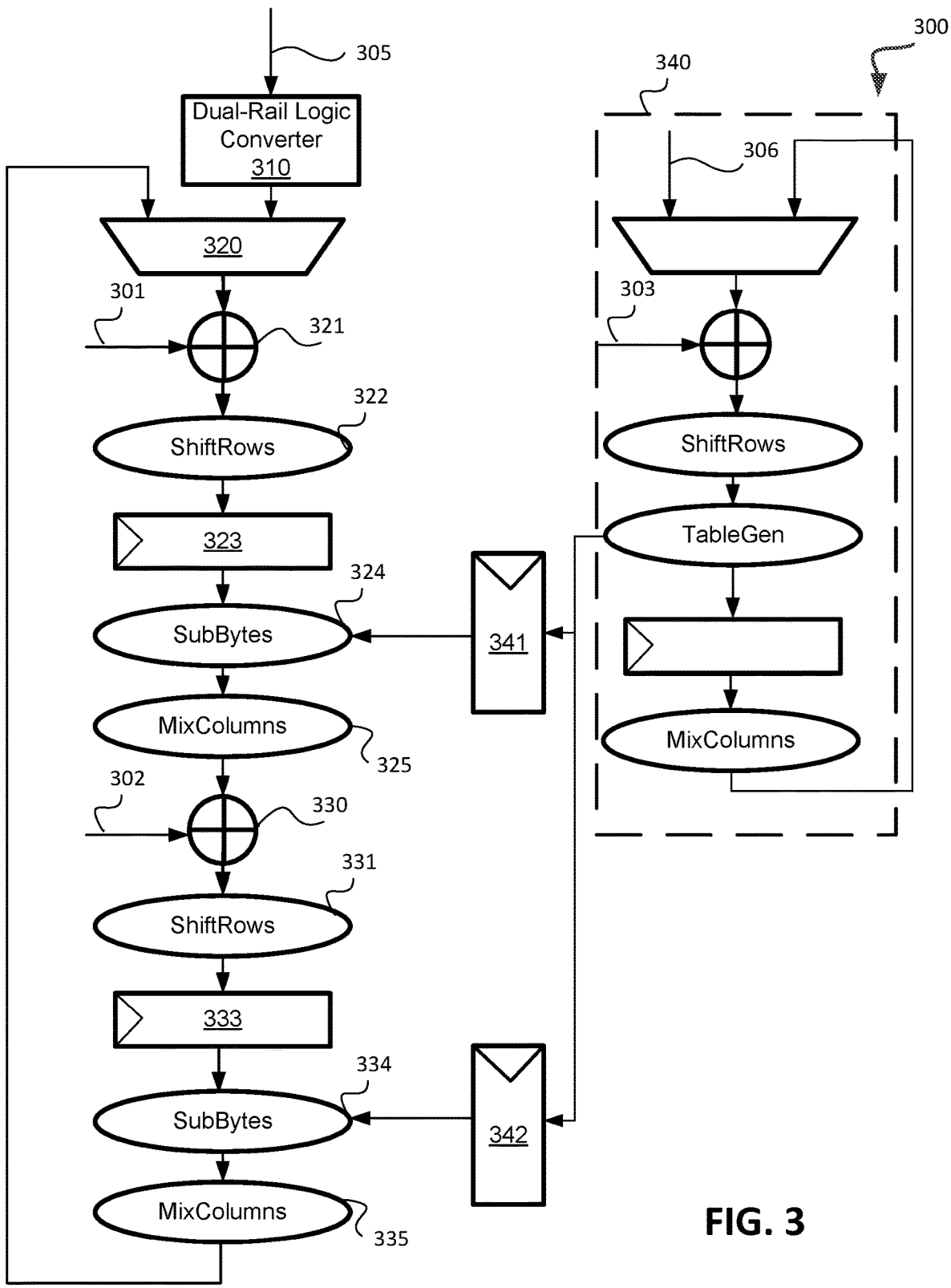
FIG. 3 illustrates an example architecture of cryptographic round function components that are used to perform an evaluation operation with a pre-charge operation in accordance with some embodiments of the present disclosure.

FIG. 3 illustrates an example architecture 300 of cryptographic round function components that are used to perform an evaluation operation with a pre-charge operation. The architecture 300 may correspond to the architecture 100 of FIG. 1. In some embodiments, the architecture 300 may correspond to an architecture to perform the evaluation operation and the pre-charge operation with respect to a data path.

The architecture 300 may correspond to AES cryptographic round functions that utilize LMDPL to provide a DPA countermeasure for the AES cryptographic round functions. In some embodiments, the AES cryptographic round functions may be used to encrypt input data. The architecture 300 may be implemented based on dual-rail logic. For example, the function components of the architecture 300 may be implemented by operating on bit values at a value of 0 and a 1 so that a true network and a complementary false network may be included in each of the function components. As shown, the function components of the AES cryptographic operation may be the AddRoundKey, ShiftRows, SubBytes, and MixColumns sub-operations. In some embodiments, the AES cryptographic operation may operate on a two-dimensional array of bytes where the ShiftRows, SubBytes, and MixColumns sub-operations may each perform a transformation of the bytes in the two-dimensional array to modify one or more of the bytes. Each round may further include an exclusive-or (XOR) operation that is performed on data to be used in the round and a round key. For example, the XOR operation 321 of the first round may utilize a round key 301 and the XOR operation 330 of the second round may utilize a second round key 302.

The mask value generator 340 may be based on an LMDPL DPA countermeasure as previously described. The LMDPL countermeasure may be used to provide a mask value (e.g., a round mask value) that is based on an input mask 306 that is combined with a round key mask value 303 by an XOR operation. The mask value may be based on transformations of the bytes of the output of the XOR operation and may be repeated for each round of the AES cryptographic operation to generate a different mask value (e.g., a different mask value) to be used in each evaluation operation of the AES cryptographic operation.

In operation, the input data 305 may be received by a dual-rail logic converter 310. The dual-rail logic converter 310 may convert the input data 305 by generating a complementary input data. The input data 305 and the complementary input data may then be provided to a selection unit such as the multiplexer 320. A selection signal of the multiplexer 320 may be used to transmit the output of the dual-rail logic converter 310 to an XOR component 321 so that the output may be combined with a round key 301. The first evaluation operation may then be performed by the first function component. For example, the ShiftRows sub-operation 322 may be performed with the output of the XOR operation 321 and the result may be stored at the register 323. The SubBytes sub-operation 324 may then be performed with the output stored at the register 323 and a countermeasure value stored at the register 341 that has been generated by the mask value generator 340. The MixColumns sub-operation 325 may then transform the output of the SubBytes sub-operation 324 and the result is combined with another round key 302 by the XOR operation 330. The output of the XOR operation 330 may then be subjected to the ShiftRows sub-operation 331 and the result may be stored at the register 333. During the first evaluation operation, the second function component may be pre-charged by resetting the values at the SubBytes sub-operation 334 and registers 333 and 342. Subsequently, when the first evaluation operation has completed and the output of the ShiftRows sub-operation 331 has been stored at the register 333, a subsequent evaluation operation may be performed by the second function component. For example, the SubBytes sub-operation 334 may be performed with the results of the first evaluation operation and a new mask value generated by the mask value generator 340 that is stored at the register 342. The MixColumns sub-operation 335 may then be performed with the output of the SubBytes sub-operation 334 and the result may be received by the multiplexer 320. Further evaluation operations may be performed for each round as necessary to complete the AES operation. As the subsequent evaluation operation is being performed, the components of the SubBytes sub-operation 324 and registers 323 and 341 may be pre-charged.

Thus, in a single cycle (i.e., clock cycle), the evaluation operation may be performed with the first function component while the pre-charge operation may be performed with the second function component. Subsequently, the pre-charge operation may be performed with the first function component while the evaluation operation may be performed with the second function component that had completed the pre-charge operation.

Figure 4:
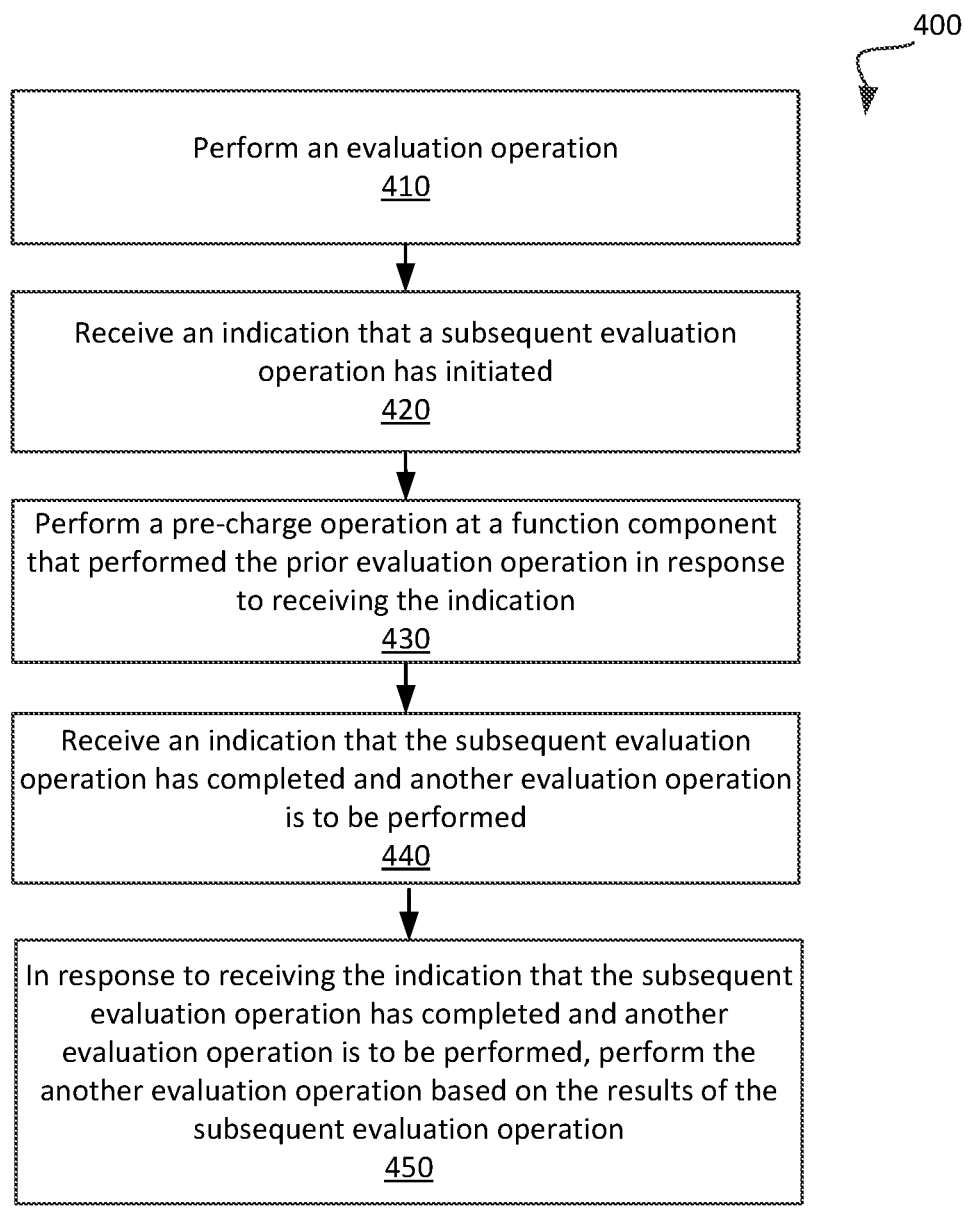
FIG. 4 is a flow diagram of an example method to perform an evaluation operation and a pre-charge operation at a function component in accordance with some embodiments of the present disclosure.

FIG. 4 is a flow diagram of an example method 400 to perform an evaluation operation and a pre-charge operation at a function component. The method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the architecture 100 of FIG. 1 or architecture 300 of FIG. 3.

As shown in FIG. 4, the processing logic may perform an evaluation operation (block 410). For example, a first function component may perform a round of a cryptographic operation. The results of the evaluation operation may be stored at a register or other such memory element of the first function component. The processing logic may further receive an indication that a subsequent evaluation operation has initiated (block 420). For example, a second function component may have started the performance of a subsequent round of the cryptographic operation with the results of the prior evaluation operation generated by the first function component and that have been stored at the register. In response to receiving the indication that the subsequent evaluation operation has initiated, the processing logic may perform a pre-charge operation at the function component that performed the prior evaluation operation (block 430). For example, components and registers of the first function component may be pre-charged. The processing logic may further receive an indication that the subsequent evaluation operation has completed and another evaluation operation is to be performed (block 440). For example, the cryptographic operation may be implemented by the performance of additional rounds or evaluation operations and another evaluation operation may be performed when the additional rounds or evaluation operations needed to complete the cryptographic operation have not been performed by the function components. In response to receiving the indication that the subsequent evaluation operation has completed and another evaluation operation is to be performed, the processing logic may perform another evaluation operation based on the results of the subsequent evaluation operation that had completed (block 450). For example, the first function component that had been pre-charged may perform another evaluation operation that corresponds to another round of the cryptographic operation.

Figure 5:
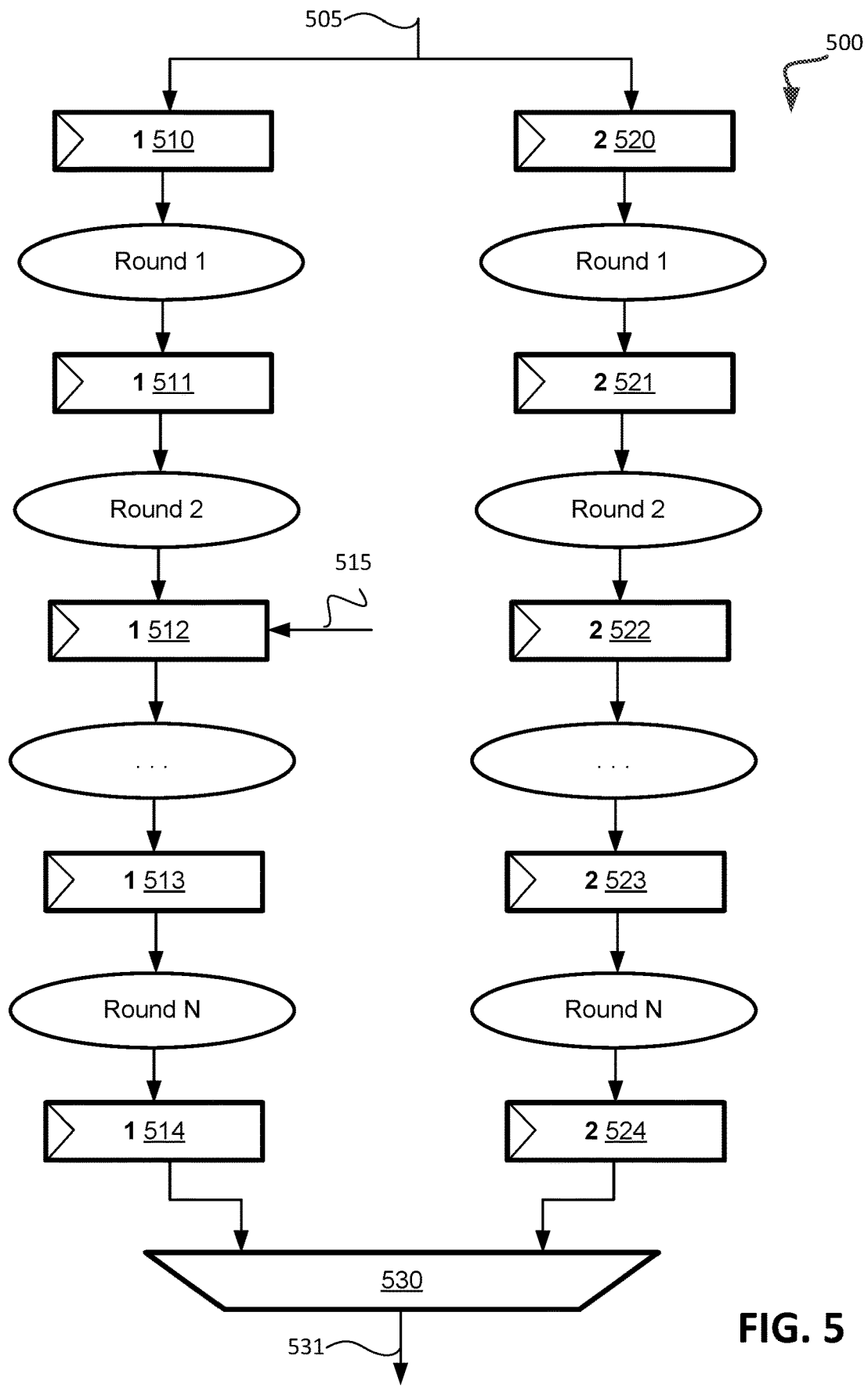
FIG. 5. illustrates an example architecture of a pipeline architecture to perform an evaluation operation with a pre-charge operation in accordance with some embodiments.

FIG. 5. illustrates an example architecture 500 of a pipeline architecture to perform an evaluation operation with a pre-charge operation. The architecture 500 may include multiple pipelines that each correspond to the performance of an operation such as a cryptographic operation.

As shown in FIG. 5, the architecture 500 may include a first pipeline (e.g., components in the left portion of the architecture 500) and a second pipeline (e.g., components in the right portion of the architecture 500). The first pipeline may include function components and memory elements. For example, the first pipeline may include function components that perform an evaluation operation for a round of the cryptographic operation and registers that separate the function components. As shown, the first pipeline may include memory elements or registers 510, 511, 512, 513, and 514 and may include function components to perform evaluation operations corresponding to a first round through n-number of rounds. The second pipeline may include other function components and memory elements. For example, the second pipeline may include function components that perform an evaluation operation for a round of another cryptographic operation and registers that separate the other function components. As shown, the second pipeline may include memory elements or registers 520, 521, 522, 523, and 524 and may include function components to perform evaluation operations corresponding to a first round through N-number of rounds of another cryptographic operation. The architecture 500 may further include a selection unit 530 (e.g., a multiplexer) that provides an output 531 from one of the first pipeline or second pipeline based on a selection signal.

In operation, a first data may be received from the input signal 505. The first data may be received by the first pipeline and may not be received by the second pipeline. Furthermore, a subsequent data from the input signal 505 may be received by the second pipeline and may not be received by the first pipeline. For example, the registers 510 and 520 may alternate between storing data received from the input signal 505 so that at a first time the register 510 may store data from the input signal 505 while the register 520 does not store data from the input signal 505. Additionally, at a second time, the register 510 may store data from the input signal 505 while the register 520 does not store data from the input signal 505. The evaluation operations for each of the rounds of each of the first and second pipelines may be performed based on the data received by the respective pipeline. Furthermore, the function components and registers of the first pipeline and the second pipeline may alternate between pre-charge operations and evaluation operations. For example, at a first time, the first pipeline may perform evaluation operations at its respective function components. For example, the first pipeline may receive data at registers 510, 512, and 514 and perform evaluation operations at the function components corresponding to the different rounds of the cryptographic operation. At the same time, the second pipeline may perform pre-charge operations at its respective function components. For example, the second pipeline may perform pre-charge operations at the function components corresponding to the different rounds and may also pre-charge a subset of the registers. For example, the registers 520, 522, and 524 may be pre-charged with the function components of the second pipeline. At a second time that is subsequent to the first time (e.g., a next clock cycle), the first pipeline may perform the pre-charge operations while the second pipeline may perform evaluation operations. For example, the pre-charge operations may be performed with the first pipeline at registers 510, 512, and 514 as well as at the function components corresponding to the different rounds of the cryptographic operation. While the pre-charge operations are performed with the first pipeline at registers 510, 512, and 514, the registers 511 and 513 may receive data from the output of the evaluation operation. At the same time, the second pipeline may perform evaluation operations at its respective function components. For example, the second pipeline may perform evaluation operations at the function components corresponding to the different rounds of the function components and may also store data at registers 520, 522, and 524. Furthermore, while the pre-charge operations are performed with the second pipeline at registers 520, 522, and 524, the registers 521 and 523 may receive data from the output of the evaluation operation at the second pipeline.

As such, the architecture 500 may include two pipelines each may perform a separate cryptographic operation. The two pipelines may accept or receive input data in alternate cycles and the resulting data of the rounds of the cryptographic operation may progress through each respective pipeline based on alternating evaluation operations and pre-charge operations.

Figure 6:
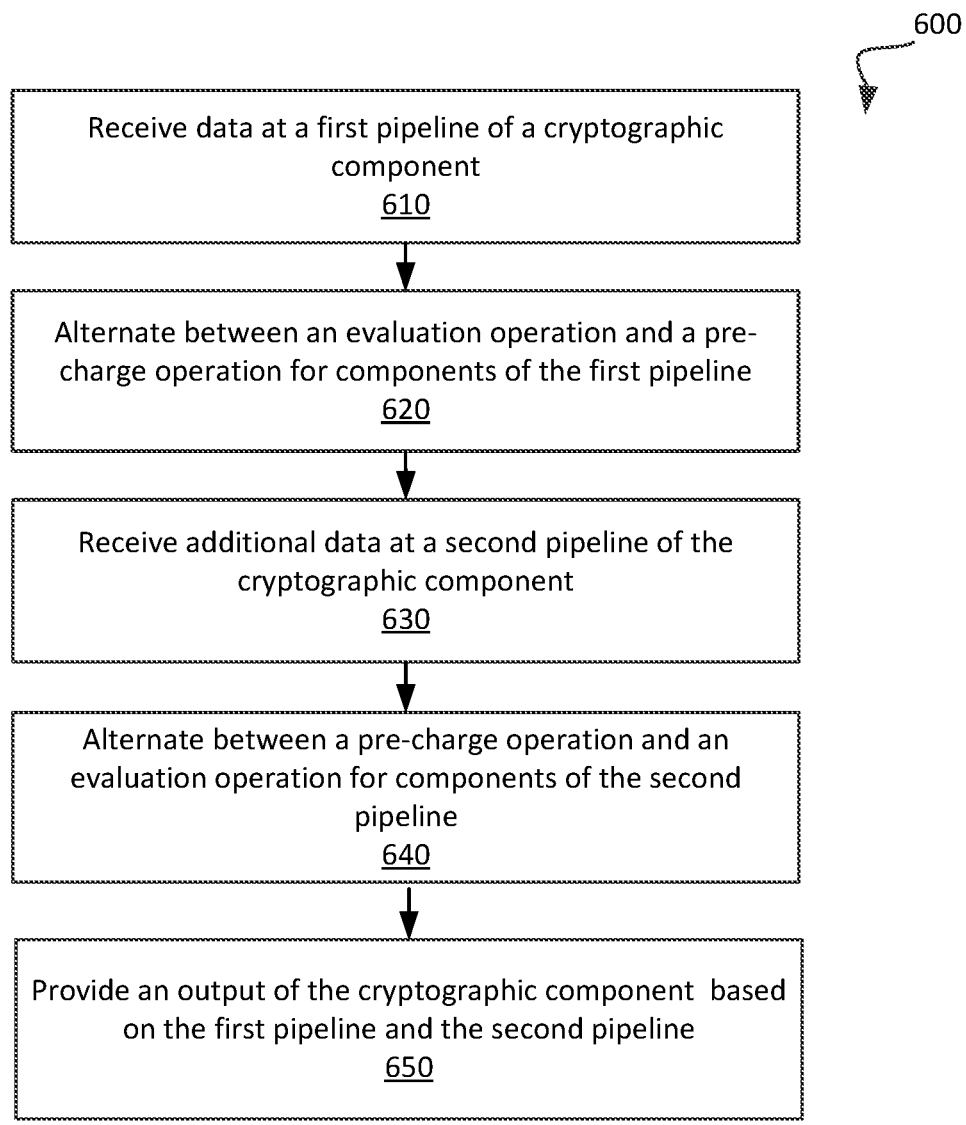
FIG. 6 is a flow diagram of an example method to alternate between a pre-charge operation and an evaluation operation of a pipeline architecture in accordance with some embodiments.

FIG. 6 is a flow diagram of an example method 600 to alternate between a pre-charge operation and an evaluation operation of a pipeline architecture. The method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 may be performed by the architecture 500 of FIG. 5.

As shown in FIG. 6, the processing logic may receive data at a first pipeline of a cryptographic component. The data may be data that is to be performed with a cryptographic operation. For example, the data may be encrypted by the cryptographic operation. The processing logic may further alternate between an evaluation operation and a pre-charge operation for components of the first pipeline (block 620). For example, the performance of the evaluation operation at function components and the storing of data at registers and the performance of the pre-charge operation at the function components and a subset of the registers may be alternated through each cycle of the first pipeline. For example, the first pipeline may perform the evaluation operation at a first clock cycle of the cryptographic component and may perform the pre-charge operation at a second clock cycle of the cryptographic component. The processing logic may further receive additional data at a second pipeline of the cryptographic component (block 630). For example, the additional data may be received after the prior data has been received by the first pipeline of the cryptographic component. In some embodiments, the additional data may be received at a next clock cycle of the cryptographic operation with respect to the first pipeline receiving the prior data. Furthermore, the processing logic may alternate between a pre-charge operation and an evaluation operation for components of the second pipeline (block 640). For example, the second pipeline may perform the pre-charge operation at a first clock cycle of the cryptographic component and may perform the evaluation operation at a next second clock cycle of the cryptographic component. Furthermore, the second pipeline may perform the pre-charge operation when the evaluation operation is being performed at the first pipeline and the second pipeline may perform the evaluation operation when the pre-charge operation is being performed at the first pipeline. The processing logic may further provide an output of the cryptographic component based on the first pipeline and the second pipeline (block 650). For example, after data has progressed through the different rounds of each of the first pipeline and the second pipeline (e.g., the pipelines are full), a selection unit (e.g., the multiplexer) may alternate between outputting the result of the final round of the first pipeline and the result of the final round of the second pipeline. In some embodiments, the first and second pipelines may operate in synchronization where a number of bits (e.g., 256 bits) may be received every two clock cycles as opposed to data being received each clock cycle by the alternating first and second pipelines. Furthermore, although two pipelines are described, any number of pipelines may be used.

Figure 7:
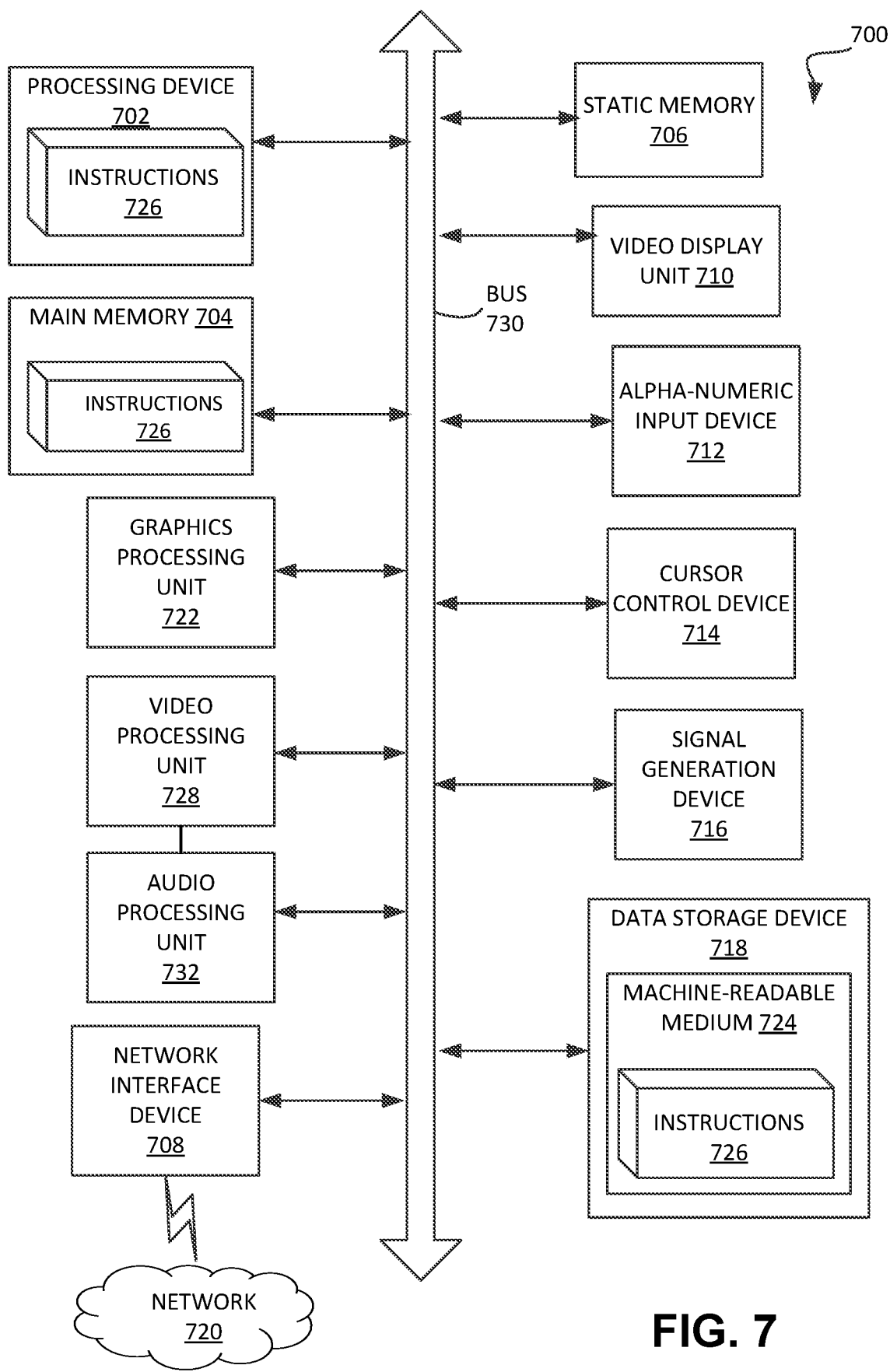
FIG. 7 illustrates a block diagram of an embodiment of a computer system in which some embodiments of the disclosure may operate.

FIG. 7 illustrates an example of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), graphics processing unit 722, video processing unit 728, audio processing unit 732, video display unit 710, alphanumeric input device 712, cursor control device 714, a signal generation device 716, and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality as described herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
receiving an input data;
performing, by a processing device, a first portion of a cryptographic operation of a first cycle of operations with the received input data at a first function component;
concurrently with the performance of the first portion of the cryptographic operation at the first function component, performing a first pre-charge operation of the first cycle of operations at a second function component;
subsequent to the performance of the first cycle of operations, performing a second portion of the cryptographic operation of a second cycle of operations with a result of the first portion of the cryptographic operation performed at the first function component; and
concurrently with the performance of the second portion of the cryptographic operation, performing a second pre-charge operation of the second cycle of operations at the first function component.

2. The method of claim 1, wherein the first pre-charge operation corresponds to a resetting of values stored at the second function component and a memory element that is to store a result of the second portion of the cryptographic operation.

3. The method of claim 1, wherein the first function component and the second function component are based on dual-rail logic.

4. The method of claim 1, wherein the first portion of the cryptographic operation is further performed with a first masked value, and wherein the second portion of the cryptographic operation is performed with a masked value.

5. The method of claim 1, wherein
performing the second pre-charge operation at the first function component comprising:
resetting values of the first function component.

6. The method of claim 5, wherein performing the second pre-charge operation at the first function component further comprises:
performing the second pre-charge operation at a memory element storing the result of the first portion of the cryptographic operation and another memory element storing a mask value used during the performing of the first portion of the cryptographic operation.

7. The method of claim 1, wherein the first portion and the second portion of the cryptographic operation correspond to rounds of a block cipher.

8. A system comprising:
a first pipeline of components and memory elements to perform a first cryptographic operation;
a second pipeline of components and memory elements to perform a second cryptographic operation; and
a processing device, operatively coupled with the first pipeline and the second pipeline, to:
provide a first input data to the first pipeline of components and memory elements;
perform a first evaluation operation of the first cryptographic operation using the first input data at the first pipeline of components and memory elements, wherein the first evaluation operation is included in a first cycle of operations;
concurrently with the performance of the first evaluation operation, perform a first pre-charge operation at the second pipeline of components and memory elements, wherein the first evaluation operation is included in the first cycle of operations;
provide a subsequent second input data to the second pipeline of components and memory elements;
subsequent to the performance of the first cycle of operations, perform a second evaluation operation of the second cryptographic operation using the second input data at the second pipeline of components and memory elements, wherein the second evaluation operation is included in a second cycle of operations; and
concurrently with the performance of the second evaluation operation, perform a second pre-charge operation at the first pipeline of components and memory elements, wherein the second evaluation operation is included in the second cycle of operations.

9. The system of claim 8, wherein the components of the first pipeline and the components of the second pipeline are implemented based on dual-rail logic.

10. The system of claim 8, wherein the processing device is further to:
generate an output based on the first pipeline and the second pipeline, wherein the output is based on a value from the first pipeline at a first time and the output is based on another value from the second pipeline at a subsequent time.

11. The system of claim 8, wherein the first cryptographic operation and the second cryptographic operation each correspond to an Advanced Encryption Standard (AES) operation.

12. A system comprising:
a first function component;
a second function component; and
a processing device, operatively coupled with the first function component and the second function component, to:
receive an input data;
perform a first portion of a cryptographic operation of a first cycle of operations with the received input data at the first function component;
concurrently with the performance of the first portion of the cryptographic operation at the first function component, perform a first pre-charge operation of the first cycle of operations at the second function component;
subsequent to the first cycle of operations, perform a second portion of the cryptographic operation of a second cycle of operations with a result of the first portion of the cryptographic operation performed at the first function component; and
concurrently with the performance of the second portion of the cryptographic operation, perform a second pre-charge operation of the second cycle of operations at the first function component.

13. The system of claim 12, wherein the first pre-charge operation corresponds to a resetting of values stored at the second function component and a memory element that is to store a result of the second portion of the cryptographic operation.

14. The system of claim 12, wherein the first function component and the second function component are based on dual-rail logic.

15. The system of claim 12, wherein the first portion of the cryptographic operation is further performed with a first masked value, and wherein the second portion of the cryptographic operation is performed with a second masked value.

16. The system of claim 12, wherein
to perform the second pre-charge operation at the first function component, the processing device is to:
reset values of the first function component.

17. The system of claim 16, wherein to perform the second pre-charge operation at the first function component, the processing device is to:
perform the second pre-charge operation at a memory element storing the result of the first portion of the cryptographic operation and another memory element storing a mask value used during the performance of the first portion of the cryptographic operation.

18. The system of claim 12, wherein the first portion and the second portion of the cryptographic operation correspond to rounds of a block cipher.

* * * * *